United States Patent [19]
Manze et al.

[11] Patent Number: 5,675,826
[45] Date of Patent: Oct. 7, 1997

[54] IMAGE DATA STORAGE

[75] Inventors: Simon Matthew Manze, Guildford; Morgan William Amos David, Farnham; David John Hedley, Winchester, all of United Kingdom

[73] Assignees: Sony Corporation, Tokyo, Japan; Sony United Kingdom Limited, Weybridge, England

[21] Appl. No.: 631,624

[22] Filed: Apr. 5, 1996

Related U.S. Application Data

[63] Continuation of Ser. No. 192,824, Feb. 7, 1994.

[30] Foreign Application Priority Data

Apr. 8, 1993 [GB] United Kingdom ............. 9307409

[51] Int. Cl.$^6$ ........................................ G06F 5/00
[52] U.S. Cl. ................. 395/800; 395/118; 395/123; 395/510; 395/405
[58] Field of Search ........................ 395/800, 118, 395/123, 510, 405

[56] References Cited

U.S. PATENT DOCUMENTS

| | | | |
|---|---|---|---|
| 4,615,013 | 9/1986 | Yan et al. ........................... | 395/130 |
| 4,811,099 | 3/1989 | Hedley et al. ...................... | 348/718 |
| 4,894,646 | 1/1990 | Ryman ................................ | 345/201 |
| 5,109,348 | 4/1992 | Pfeiffer et al. ..................... | 395/505 |
| 5,208,875 | 5/1993 | Virtue et al. ...................... | 382/54 |
| 5,237,657 | 8/1993 | Pearman et al. ................... | 395/164 |
| 5,251,296 | 10/1993 | Rhoden et al. ..................... | 395/517 |
| 5,276,519 | 1/1994 | Richards et al. ................... | 358/209 |
| 5,581,733 | 12/1996 | Toda ................................... | 395/492 |

FOREIGN PATENT DOCUMENTS

A0176289  2/1986  European Pat. Off. ......... H04N 5/76

*Primary Examiner*—Alyssa H. Bowler
*Assistant Examiner*—John Follansbee
*Attorney, Agent, or Firm*—William S. Frommer; Alvin Sinderbrand

[57] ABSTRACT

An image data value storage system is described comprising a plurality of tiled memories which are fed with a single set of read addresses from a read address generator. The data stored within each of the tiled memories is offset relative to each other by the action of a delay unit upon writing of the data into the memory units. Thus, a single set of read addresses accesses a larger contiguous array of image data values than is individually addressed within each of the memory units.

10 Claims, 7 Drawing Sheets

IMAGE DATA STORAGE

This application is a continuation of application Ser. No. 08/192,824, filed Feb. 7, 1494.

BACKGROUND OF THE INVENTION

1. Field of the Invention

This invention relates to the field of image data storage. More particularly, this invention relates to image data storage where simultaneous access to a contiguous array of image data values is required.

2. Description of the Prior Art

An image data storage system that provides such simultaneous access to a plurality of image data values is described in European Published Patent Application EP-A-0 176 289. In this known system, an array of image data values is divided into a plurality of sub-array or "tiles". Image data values from common relative positions within each tile are stored within a common memory block/device. The storage system has a plurality of such memory devices that can be separately addressed and accessed. Thus, since the memory devices store image data values from different relative positions within a tile, a plurality of the storage devices can be simultaneously read to provide the image data values from a contiguous array of positions.

It will be appreciated that whenever a particular array of image data values is to be accessed, a set of read addresses for the differing memory devices must be provided. This task is complicated when the array of image data value to be accessed spans two tiles. The read addresses are generated by specially made application specific integrated circuits (ASICs) that are generally expensive to produce and occupy a relatively large area on a printed circuit board to which they are applied due to the large number of wide data buses that must be accommodated.

In accordance with the desire to achieve ever improving image quality, it is necessary to simultaneously access larger contiguous arrays of image data values than are usual for the above described system of EP-A-0 176 289. For example, when applying a two-dimensional filtering operation about a given point, a 4×4 array of pixels centred about that point may have previously been considered sufficient, whereas to achieve an improved level of image quality a 8×8 array of pixels would be desirable. A problem exists in how to achieve simultaneous access to such larger arrays of pixels without unduly increasing the cost, complexity and size of the system.

It is an object of the invention to provide improved access to larger arrays of pixel values.

SUMMARY OF THE INVENTION

Viewed from one aspect this invention provides apparatus for storing an array of image data values, said array of image data values being subdivided into a plurality of tiled sub-arrays of image data values, with an individual image data value being denotable by a tiled sub-array and a relative tile position within that tiled sub-array, said apparatus comprising:

(i) two or more tiled memory units, each tiled memory unit having a plurality of separately addressable memory blocks, each memory block storing those image data values having a common relative tile position, whereby a plurality of image data values may be simultaneously accessed from said plurality of memory blocks in response to an applied set of read addresses;

(ii) a read address generator for generating sets of read addresses such that a set of read addresses accesses a contiguous array of N image data values within a tiled memory unit; and (iii) means for writing said array of image data values into each of said tiled memory units at different addresses in each tiled memory unit, said addresses being offset between different tiled memory units such that a set of read addresses from said read address generator applied to said two or more tiled memory units accesses a contiguous array of M image data values, where M>N.

The invention provides a system in which a single read address generator (this may comprise a plurality of ASICs) is able to generate the sets of read addresses needed to access more than one tiled memory unit at a time and so provide simultaneous access to a larger array of image data values. The avoidance of the need to provide more than one read address generator for controlling this larger amount of tiled memory is a significant practical advantage.

The image data values could be written into the memory blocks one at a time if the circumstances so permitted. However, if it is also desired that the writing of the image data values should be a high speed operation, then it is preferred that said means for writing comprises a write address generator for generating write addresses for controlling into which memory blocks input image data values are written, and at least one delay unit for receiving and delaying said input image data values, said write addresses being applied to all of said tiled memory units to simultaneously store delayed image data values delayed by said at least one delay unit and non-delayed image data values to achieve said offset.

This arrangement allows image data values to be written into more than one tiled memory unit simultaneously whilst requiring only one write address generator and also providing the required offset through use of the delay unit.

In particularly high speed embodiments of the invention, each tiled memory unit comprises two sets of memory blocks such that one set of memory blocks may be read whilst writing to another set of memory blocks.

This arrangement places the two sets of memory blocks in a swing buffer type configuration whereby both writing and reading can occur at the same time.

In order to assist in reducing the costs of the system and making it as physically small as practicable, it is preferred that said read addresses generator and said means for writing comprise common integrated circuits.

The simultaneous reading of a plurality of image data values may be required for a number of different purposes, e.g. thresholding, block matching etc. However, the storage system of this invention is particularly suited to including a two-dimensional digital filter to which said simultaneously read contiguous array of M image data values is supplied.

If the two-dimensional digital filter is being used to filter about a given point, then it is possible that this point is not coincident with one of the image data value/pixel positions. In this case, the filtering can be adjusted to more precisely reflect this situation by providing that said two-dimensional digital filter has switchable filter coefficients.

With switchable filter coefficients, the filter coefficient applied to each individual image data value can be adjusted to reflect its relative position to the centre of the two-dimensional filter.

In a preferred compromise between the number of image data values that one might wish to simultaneously access and the size of the equipment needed, it has been found advantageous to provide a system having two tiled memory units.

It will be appreciated that the contiguous arrays of image data values simultaneously accessed from each of the tiled memory units could overlap. However, in order to make better use of the capabilities of the system, the number of image data values that are simultaneously accessed is N multiplied by the number of tiled memory units being used. Thus, in the case of the use of two tiled memory units, M=2×N.

Another preferred compromise is that the contiguous array of image data values accessed from one tiled memory unit is a 4×4 array. This provides an advantageous balance between the amount of hardware required for each tiled memory unit and the number of image data values that may be simultaneously accessed from that tiled memory unit.

Viewed from another aspect this invention provides a method of storing an array of image data values, said array of image data values being subdivided into a plurality of tiled sub-arrays of image data values, with an individual image data value being denotable by a tiled sub-array and a relative tile position within that tiled sub-array, said method comprising the steps of:

(i) storing those image data values having a common relative tile position in each of two or more tiled memory units having a plurality of separately addressable memory blocks, whereby a plurality of image data values may be simultaneously accessed from said plurality of memory blocks in response to an applied set of read addresses;

(ii) generating sets of read addresses such that a set of read addresses accesses a contiguous array of N image data values within a tiled memory unit; and (iii) writing said array of image data values into each of said tiled memory units at different addresses in each tiled memory unit, said addresses being offset between different tiled memory units such that a set of read addresses from said read address generator applied to said two or more tiled memory units accesses a contiguous array of M image data values, where M>N.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
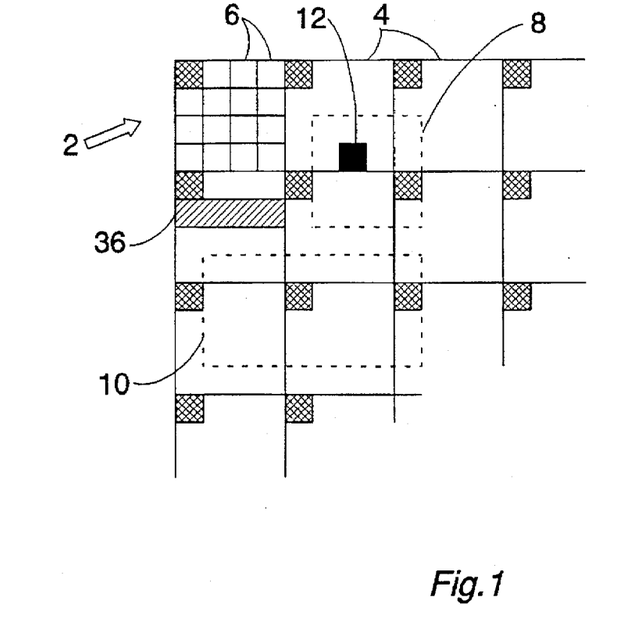
FIG. 1 illustrates an array of image data values.

FIG. 1 illustrates an array of image data values 2. This array of image data values 2 is broken down into a plurality of sub-arrays (tiles) of image data values 4. Each sub-array of image data values 4 contains sixteen image data values 6. A particular image data value 6 is denoted/specified by identifying the sub-array of image data values 4 to which it belongs together with its relative position within the 4×4 array of image data values of that sub-array of image data values 4.

All of the image data values having a common relative tile position are stored in the same memory block within the tiled memory, e.g. all of the cross hatched image data values in FIG. 1 are stored in the same memory block. Thus, when it is desired to simultaneously read a contiguous array of image data values 8, each of the individual image data values will be stored within a different memory block and so they may all be simultaneously accessed. If it is desired to read a larger contiguous array of image data values 10, then this will include more than one image data value at a given relative tile position.

Figure 2:
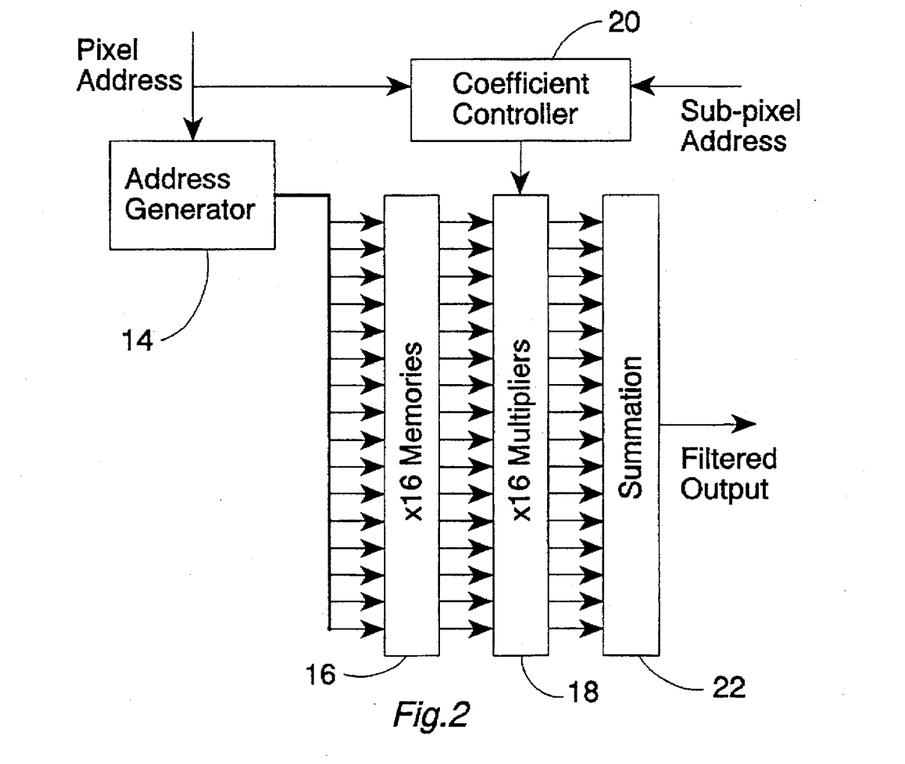
FIG. 2 schematically illustrates a tiled memory unit.

FIG. 2 schematically illustrates a tiled memory of a type suitable for reading the smaller contiguous array of image data values 8 shown in FIG. 1. The address of a reference pixel 12 within the contiguous array of image data values 8 is supplied to an address generator 14. From this address, the address generator 14 derives the fifteen other addresses within the memory blocks storing the image data values. These addresses are then supplied to the memory blocks 16.

The image data values read from the memory blocks 16 are then fed in parallel to a bank of multipliers 18 where they are individually multiplied by a coefficient controlled by a coefficient controller 20. The multiplied image data values are then fed to an adder 22 to produce a filtered output value. In this way, a contiguous array of image data values are simultaneously accessed, multiplied and added to provide a high speed filtered output. The coefficient controller is responsive to the pixel address to select the coefficients applied by each of the multipliers within the block of multipliers 18. A sub-pixel address can also be supplied to the coefficient controller 20 to select a particular set of coefficients to be applied so as to take account of the situation in which the centre of the filter is not coincident with one of the image data value positions.

Figure 3:
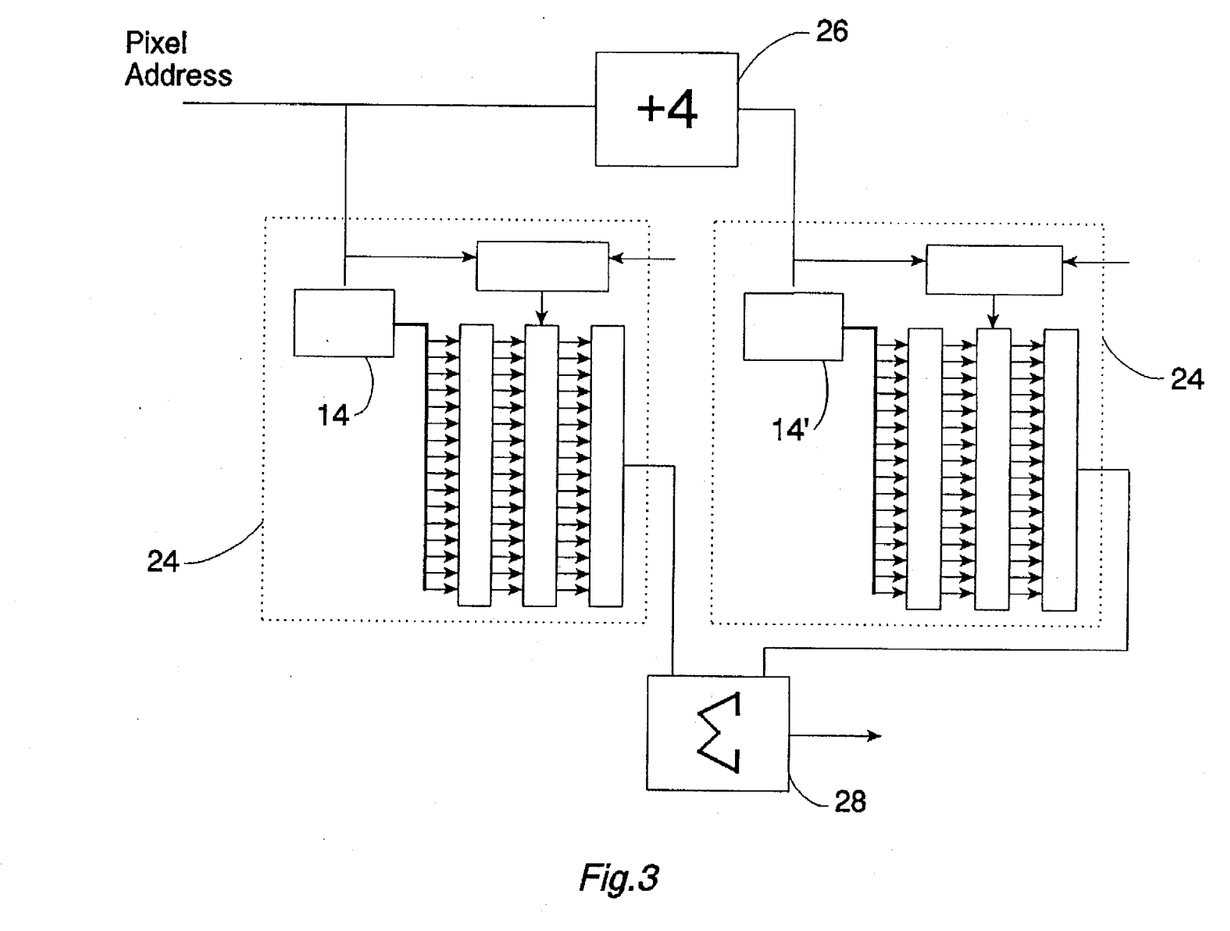
FIG. 3 schematically illustrates one non-preferred possibility for simultaneously accessing a larger number of image data values.

FIG. 3 schematically illustrates one non-preferred technique for simultaneously accessing a larger contiguous array of image data values 10 such as that shown in FIG. 1. This arrangement uses two tiled memories 24 such as that shown in FIG. 2. The input pixel address is fed directly to the address processor 14 in a first of the tiled memories and indirectly via a unit 26 that increments the address by four to an address generator 14' in a second tiled memory unit. The outputs from the tiled memory units are then summed by an adder 28 to provide the final filtered output. The arrangement of FIG. 3 suffers from the disadvantage that two separate address generators 14, 14' need to be provided.

Figure 4:
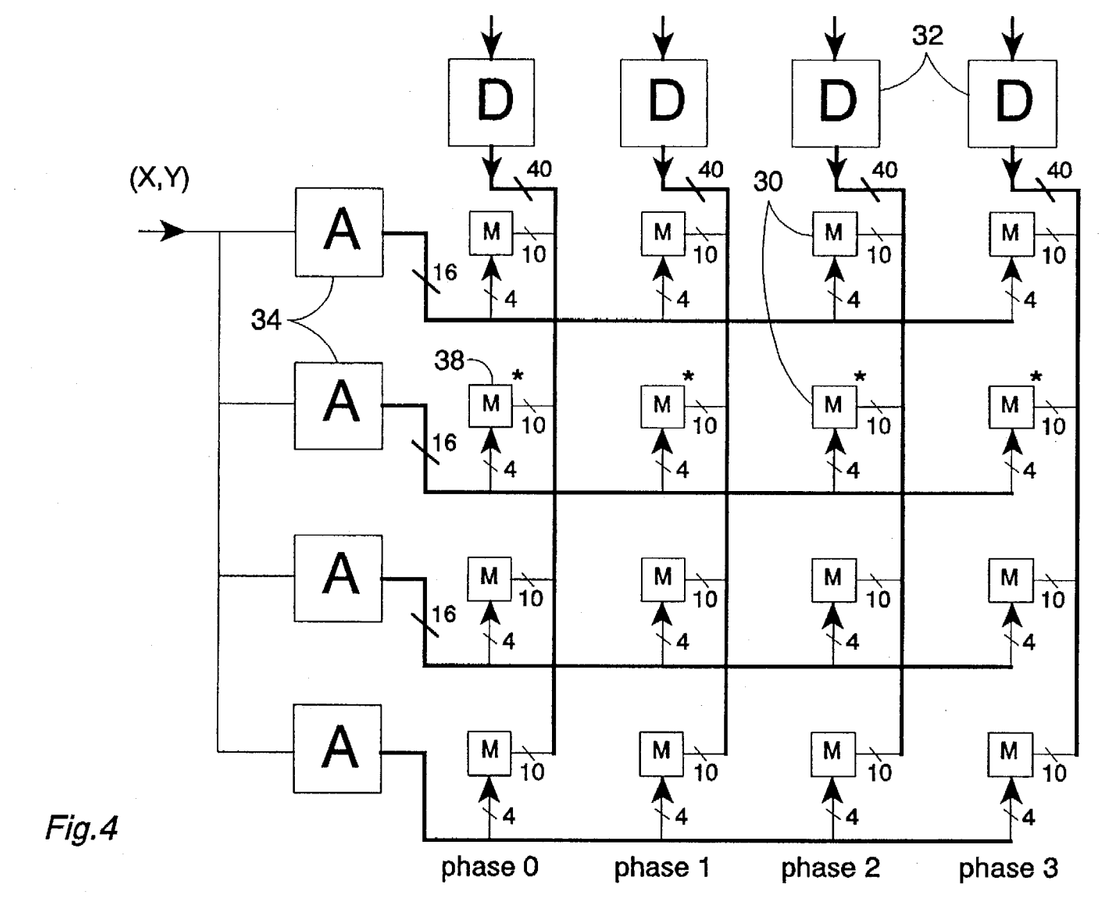
FIG. 4 illustrates the write operation into a tiled memory unit.

FIG. 4 illustrates the write operation to a tiled memory unit. The tiled memory unit contains sixteen memory blocks 30 each capable of holding 16 image data values and addressed by a 4-bit address. The image data values are 10-bit colour image data values. Four data switches 32 switch each input an image data value to the appropriate 10-bit bus of a given row into which those image data values are to be written (indicated by a "*"). The address generators 34 sequentially produce the appropriate 4-bit addresses to supply to each active memory block 30 within the row. The address generators 34 include counters that are reset on frame edges to generate the addresses. In this example of a 16×16 array of image data values, four image data values to be simultaneously written, such as those illustrated by block 36 in FIG. 1. This first image data value is written into memory block The address generator also simultaneously produces addresses incremented 1, 2, and 3 to be provided to the other currently active memory blocks 30. This process is repeated for sets of four image data values until the full input array of image data values has been stored within the tiled memory.

Figure 5:
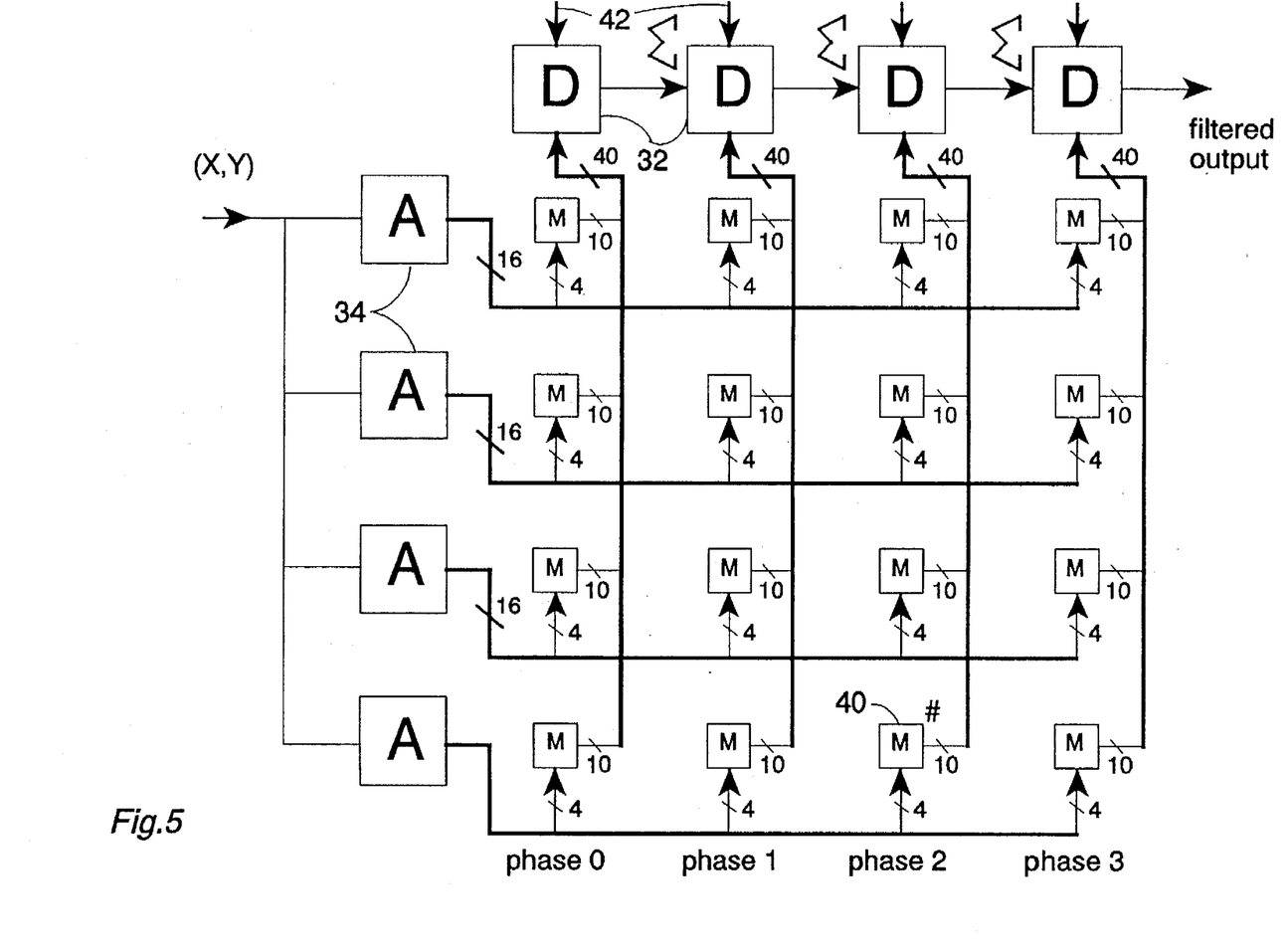
FIG. 5 illustrates the read operation from a tiled memory unit.

FIG. 5 illustrates read from a tiled memory. In this case a 4×4 array of image data values are to be simultaneously read from the tiled memory. The array of image data values could be the small array of image data values 8 illustrated in FIG. 1. The reference image data value 12 within this array has the address (X, Y). This image data value is stored within the memory unit 40 that is marked with a "#". The address generators 34 in the read mode operate to generate the following addresses relative to the reference image data value 12 at coordinate (X, Y), namely:

(X−1)+((Y−1)×16), X+((Y−1)×16), (X+1)+((Y−1)×16), (X+2)+((Y−1)×16), (X−1)+(Y×16), X+(Y×16), (X+1)+(Y×16), (X+2)+(Y×16), (X−1)+((Y+1)×16), X+((Y+1)×16), (X+1)+((Y+1)×16), (X+2)+((Y+1)×16), (X−1)+((Y+2)×16), X+((Y+2)×16), (X+1)+((Y+2)×16), (X+2)+((Y+2)×16).

The sixteen 10-bit image data values so accessed are fed via the four 10-bit buses to the data switches 32 in which they are multiplied by selected coefficients 42 and summed as they are passed between the data switches 32 to produce a final filtered output.

Figure 6:
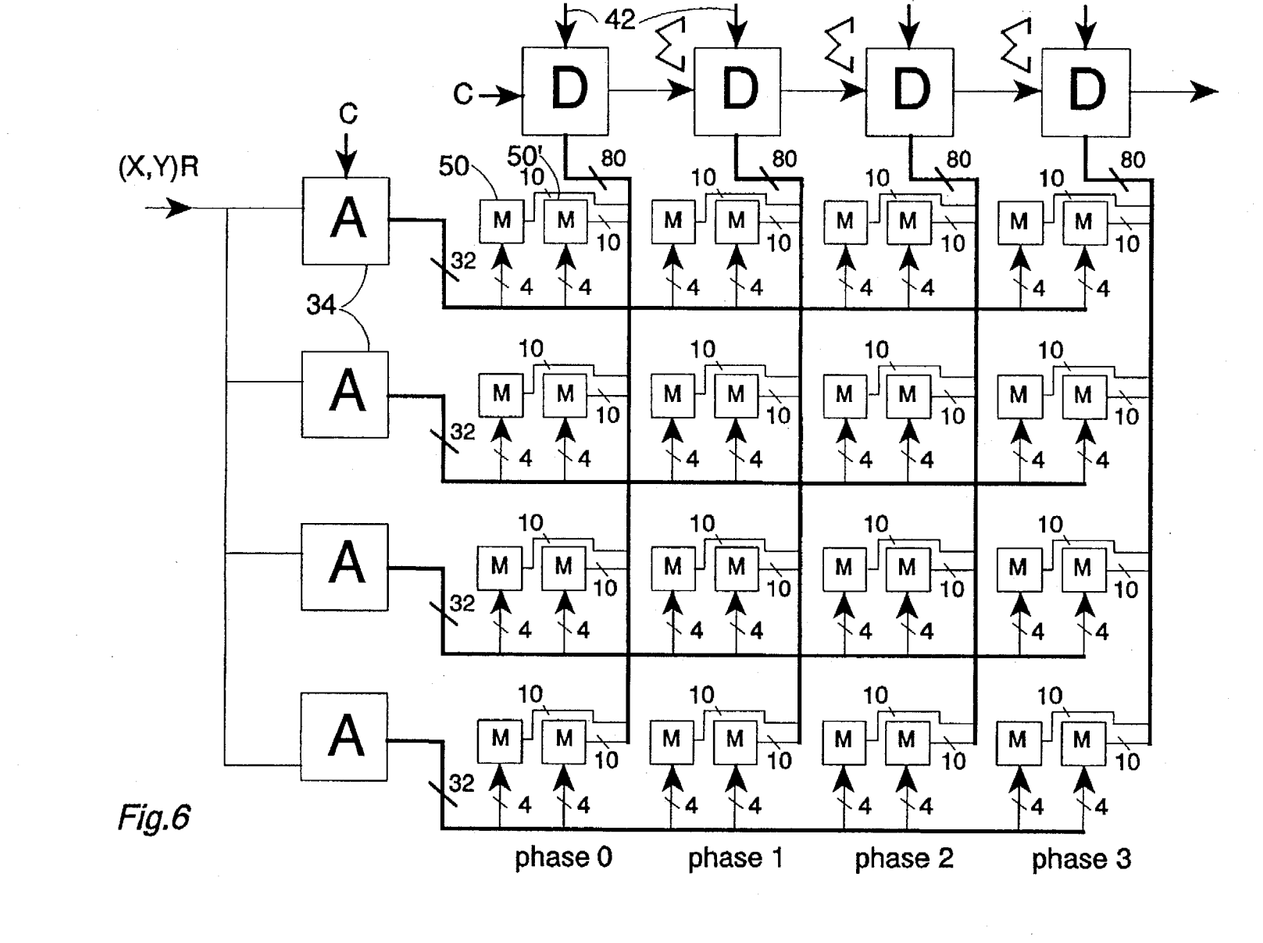
FIG. 6 illustrates the simultaneous read and write operation of a tiled memory unit.

FIG. 6 illustrates simultaneous read and write operations to the tiled memory of FIGS. 4 and 5. In this embodiment two sets of memory blocks 50, 50' are provided. These sets of memory blocks 50, 50' alternately take the roles of the memory blocks 30, 40 from FIGS. 4 and 5. The sets of memory blocks 50, 50' effectively function as a swing buffer type of arrangement in which one set of memory blocks 50 can be written to whilst the other set of memory 50' can be read from and vice versa. In order to facilitate this, the address generators 34 are simultaneously supplied with a read pixel address coordinate (X,Y)R and write pixel address coordinate (X,Y)W. A control signal C is also applied to the address generators 34 and the data switches 42 to control which of the sets of memory blocks 50, 50' is to be used for reading and writing.

Figure 7:
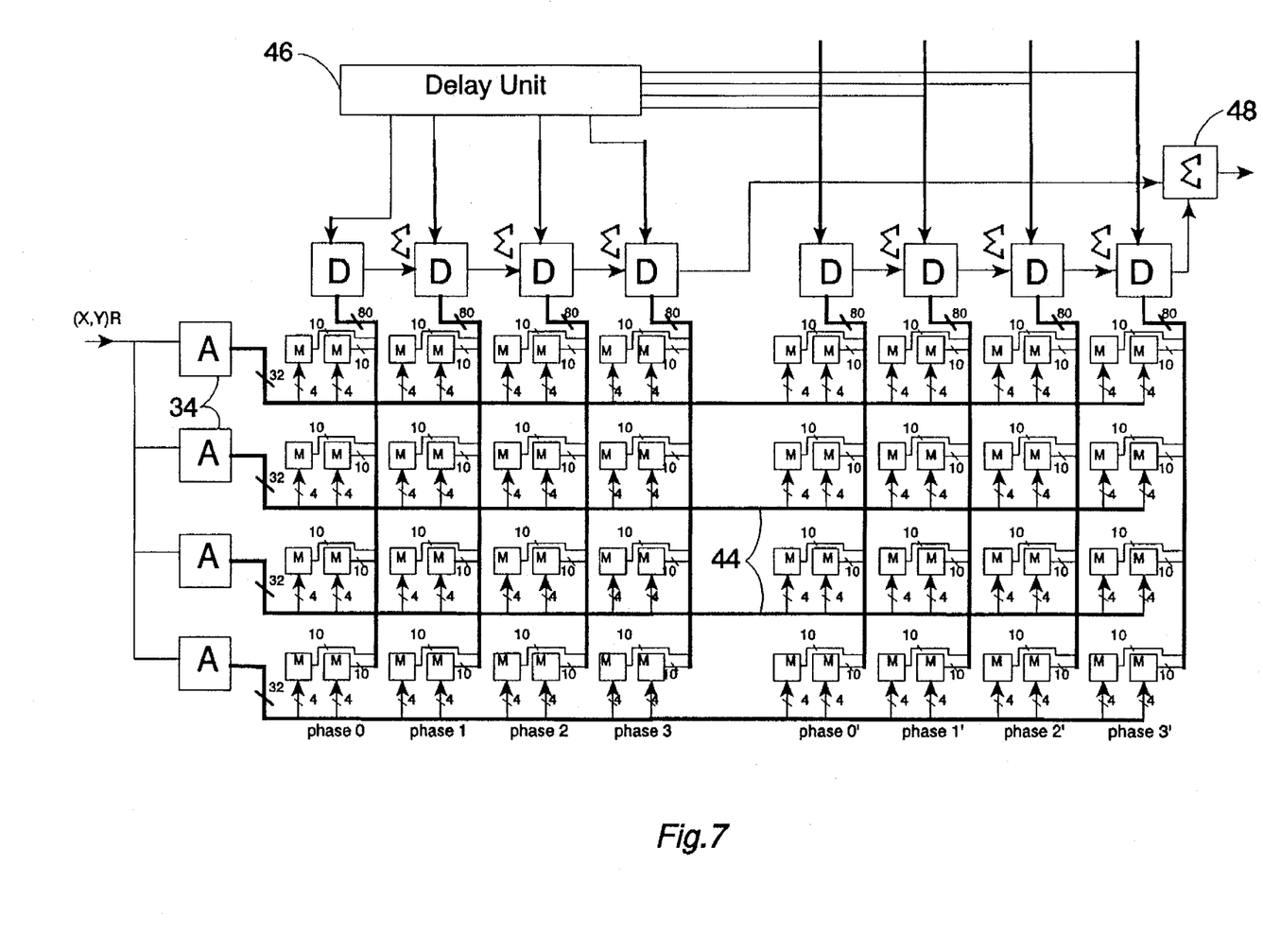
FIG. 7 illustrates a memory system having two tiled memory units and a common read/write address generator.

FIG. 7 illustrates two tiled memory sharing a common address controller. The address buses 44 from each of the address generators 34 is carried over from one tiled memory to the next tiled memory with corresponding respective memory blocks being supplied with the same read and write addresses. The 16×16 array of image data value are stored twice, once each in each of the tiled memory units. A delay unit 46 is provided that serves to store and then supply to the left hand tiled memory unit those image data values that were stored in the right hand tiled memory unit in the previous storage operation. This in effect offsets the data stored within the left hand tiled memory unit by four pixel positions. In this way, when a single set of read addresses are provided by the address generators 34, these access a large array of image data values 10 such as that illustrated in FIG. 1. The filtered output from each of the tiled memory units are fed to an adder 48 where they are summed to produce the filtered output over an 8×4 array of image data values.

Figure 8:
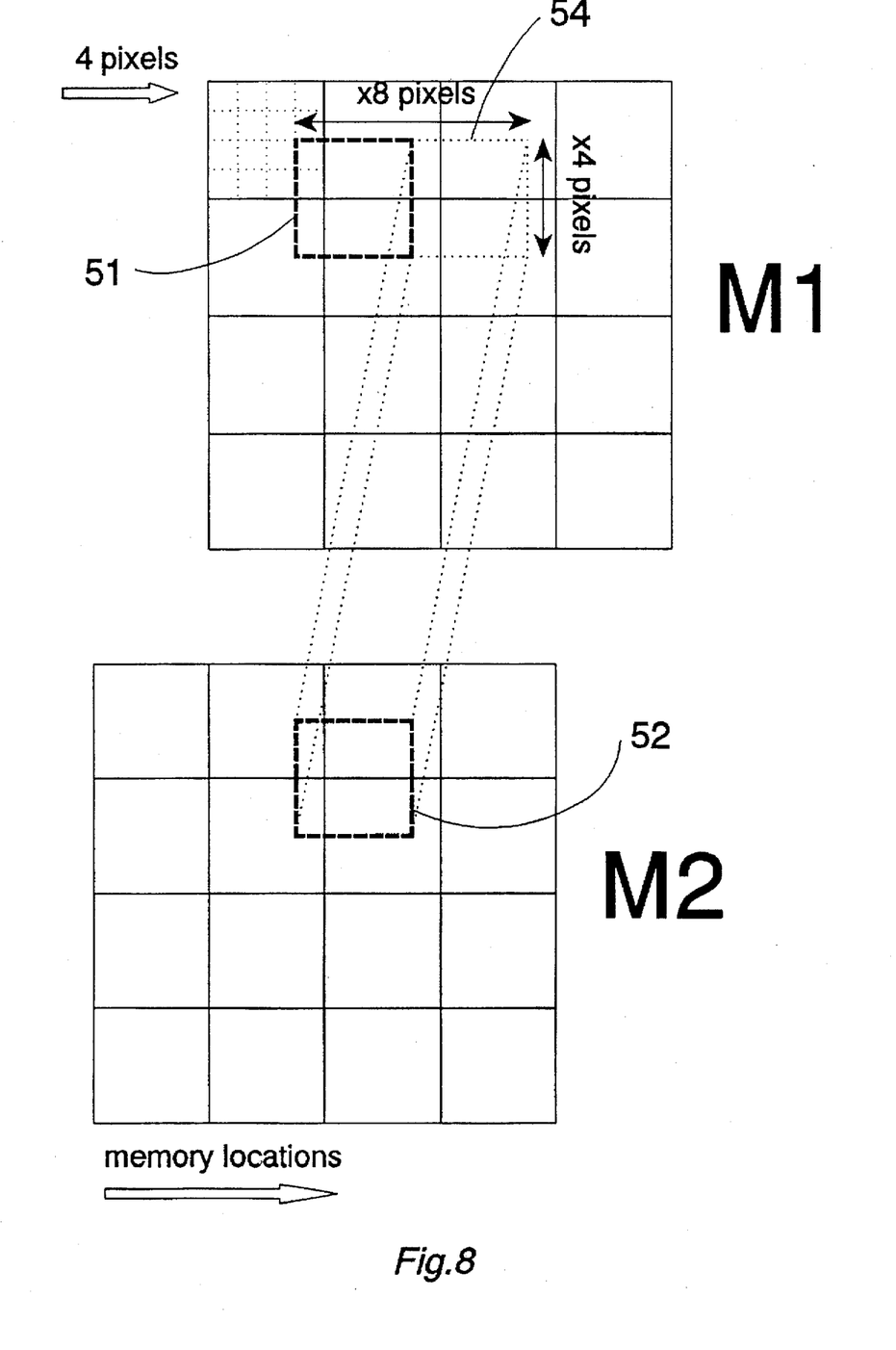
FIG. 8 is a diagram illustrating the offset storage and operation of the memory system of FIG. 7.

FIG. 8 illustrates the operation of the system of FIG. 7. The array of image data values M1 illustrates that stored in the left hand tiled memory unit of FIG. 7. The array of image data values M2 illustrates that stored in the right hand tiled memory of FIG. 7. The array of image data values M1 is effectively shifted rightwards by four pixels due to the one cycle delay in its storage. In this way, when a single set of read addresses are applied to both of the tiled memory units, an array of pixel values 51 will be read from the left hand tiled memory unit and an array of pixel values 52 will be read from the right hand tiled memory unit. The array of pixel values 52 from the right hand tiled memory unit corresponds to the array of pixels 54 stored in the left hand memory unit. Thus, a contiguous array of pixel values 51, 54 is simultaneously read.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for storing an array of image data values, said array of image data values being subdivided into a plurality of tiled sub-arrays of image data values, with an individual image data value being denotable by a tiled sub-array and a relative tile position within that tiled sub-array, said apparatus comprising:

(i) at least two tiled memory units, each tiled memory unit having N separately addressable memory blocks, where N is an integer greater than 1, each memory block storing those image data values having a common relative tile position, whereby a contiguous array of N image data values may be simultaneously accessed from said N memory blocks in response to an applied set of read addresses;

(ii) a read address generator for generating sets of read addresses such that a set of read addresses is used as an applied set of read addresses to simultaneously access the contiguous array of N image data values from a tiled memory unit; and (iii) means for writing said array of image data values into each of said tiled memory units at different addresses in each tiled memory unit, said addresses being offset between different tiled memory units such that a set of read addresses from said read address generator applied simultaneously to said at least two tiled memory units simultaneously accesses more than said contiguous array of N image data values from said at least two tiled memory units, to provide a contiguous array of M image data values, where M>N.

2. Apparatus as claimed in claim 1, wherein said means for writing comprises a write address generator for generating write addresses for controlling into which memory blocks input image data values are written, and at least one delay unit for delaying said input image data values, said write addresses being applied to all of said tiled memory units to simultaneously store delayed image data values delayed by said at least one delay unit and non-delayed image data values to achieve said offset.

3. Apparatus as claimed in claim 1, wherein each tiled memory unit comprises two sets of memory blocks such that one set of memory blocks may be read while writing to another set of memory blocks.

4. Apparatus as claimed in claim 1, wherein said read addresses generator and said means for writing comprise common integrated circuit.

5. Apparatus as claimed in claim 1, comprising a two-dimensional digital filter to which said simultaneously read contiguous array of M image data values is supplied.

6. Apparatus as claimed in claim 5, wherein said two-dimensional digital filter has switchable filter coefficients.

7. Apparatus as claimed in claim 1, comprising two tiled memory units.

8. Apparatus as claimed in claim 7, wherein M=2×N.

9. Apparatus as claimed in claim 8, wherein N=16 and said contiguous array of N image data values is a 4×4 array.

10. A method of storing an array of image data values, said array of image data values being subdivided into a plurality of tiled sub-arrays of image data values, with an individual image data value being denotable by a tiled sub-array and a relative tile position within that tiled sub-array, said method comprising the steps of:

(i) storing those image data values having a common relative tile position in at least two tiled memory units having N separately addressable memory blocks, where N is an integer greater than 1, whereby a contiguous array of N image data values may be simultaneously accessed from said N memory blocks in response to an applied set of read addresses;

(ii) generating sets of read addresses such that a set of read addresses is used as an applied set of read addresses to simultaneously access the contiguous array of N image data values from a tiled memory unit; and (iii) writing said array of image data values into each of said tiled memory units at different addresses in each tiled memory unit, said addresses being offset between different tiled memory units such that a set of generated read addresses applied simultaneously to said at least two tiled memory units simultaneously accesses more than said contiguous array of N image data values from said at least two tiled memory units, to provide a contiguous array of M image data values, where M>N.

* * * * *